United States Patent
Welsh, Jr.

(10) Patent No.: US 9,435,071 B2
(45) Date of Patent: Sep. 6, 2016

(54) LEG RETAINING CLIP

(71) Applicant: PD3D, Inc., Aurora, IL (US)

(72) Inventor: Thomas J. Welsh, Jr., Aurora, IL (US)

(73) Assignee: Homally Inc., North Barrington, IL (US)

( * ) Notice: Subject to any disclaimer, the term of this patent is extended or adjusted under 35 U.S.C. 154(b) by 0 days.

(21) Appl. No.: 14/624,436

(22) Filed: Feb. 17, 2015

(65) Prior Publication Data

US 2015/0233047 A1    Aug. 20, 2015

Related U.S. Application Data

(60) Provisional application No. 61/940,520, filed on Feb. 17, 2014.

(51) Int. Cl.
| | | |
|---|---|---|
| *D06F 81/02* | (2006.01) | |
| *A47B 3/08* | (2006.01) | |
| *F16L 3/02* | (2006.01) | |
| *F16B 2/24* | (2006.01) | |

(52) U.S. Cl.
CPC ............. *D06F 81/02* (2013.01); *A47B 3/08* (2013.01); *A47B 3/0809* (2013.01); *F16B 2/24* (2013.01); *F16L 3/02* (2013.01); *A47B 2003/0821* (2013.01)

(58) Field of Classification Search
CPC ........ D06F 81/00; D06F 81/02; D06F 81/04; D06F 81/06; A47B 3/08; A47B 3/002; A47B 3/008; A47B 3/0809; A47B 2003/0821; A47B 2003/0827; A47B 2200/0034; A47B 3/0815; B21F 35/04; F16F 1/12; F16L 3/1211; F16L 3/1207; F16L 3/02; F16L 3/04; F16B 2/20; F16B 2/22; F16B 2/24; F16B 2/245
See application file for complete search history.

(56) References Cited

U.S. PATENT DOCUMENTS

| | | | | |
|---|---|---|---|---|
| 2,685,752 A | * | 8/1954 | Healy, Sr. ............... | D06F 81/04 108/121 |
| 2,721,407 A | * | 10/1955 | Sutherland .............. | D06F 81/04 108/121 |
| 2,785,936 A | | 3/1957 | Cvikich | |
| 3,093,412 A | * | 6/1963 | Gore ....................... | A47C 13/00 297/188.04 |
| 3,265,019 A | | 8/1966 | Haydock | |
| 3,512,620 A | * | 5/1970 | Bell ........................ | A45C 9/00 108/12 |
| 5,603,267 A | | 2/1997 | Soper | |
| 5,667,177 A | * | 9/1997 | Van Leeuwen ......... | F16B 2/245 248/73 |
| 6,641,093 B2 | * | 11/2003 | Coudrais ................. | F16L 3/13 248/68.1 |
| 7,225,745 B2 | | 6/2007 | Schwerdlin | |
| 7,395,620 B1 | * | 7/2008 | McNeely ................ | D06F 81/06 108/48 |
| 2009/0146021 A1 | * | 6/2009 | Becker .................... | F16L 3/02 248/68.1 |
| 2013/0047820 A1 | * | 2/2013 | Chambers ............. | G10D 13/003 84/453 |
| 2014/0252178 A1 | * | 9/2014 | Myers ..................... | F16B 2/12 248/74.1 |
| 2015/0090845 A1 | * | 4/2015 | Trelford ............... | F16M 13/022 248/68.1 |

* cited by examiner

*Primary Examiner* — Ismael Izaguirre
(74) *Attorney, Agent, or Firm* — Keith A. Vogt; Vogt IP

(57) ABSTRACT

In one embodiment, the present invention provides an ironing board having a leg-retaining clip adapted for use with at least one adjustable leg. The board includes a plate secured in a spaced relationship from the board. The leg-retaining clip includes a base having a first side and a second side. The clip also includes a base member having a first section adapted to engage one side of the plate and a second section adapted to engage another side of the plate. The base may also include at least one opening that receives a locking member located on the plate to retain the base on the plate. At least one leg-locking clip is attached to the base to releasably engage one or more adjustable legs.

9 Claims, 10 Drawing Sheets

LEG RETAINING CLIP

CROSS-REFERENCE TO RELATED APPLICATIONS

This application claims priority to U.S. Provisional Application No. 61/940,520 filed on Feb. 17, 2014 and entitled Leg Retaining Clip, which is incorporated herein in its entirety.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Field of the Invention

The present invention concerns a retaining clip that secures the folding legs of a device when the device is not in use. One particular use of the invention is with ironing boards since the folding legs of these devices often need to be securely retained when the ironing board is in a folded position.

BRIEF SUMMARY OF THE INVENTION

In one embodiment, the present invention provides an ironing board having a leg-retaining clip adapted for use with at least one adjustable leg. The board includes a plate secured in a spaced relationship from the board. The leg-retaining clip includes a base having a first side and a second side. The clip also includes a base member having a first section adapted to engage one side of the plate and a second section adapted to engage another side of the plate. The base may also include at least one opening that receives a locking member located on the plate to retain the base on the plate. At least one leg-locking clip is attached to the base to releasably engage one or more adjustable legs.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 1:
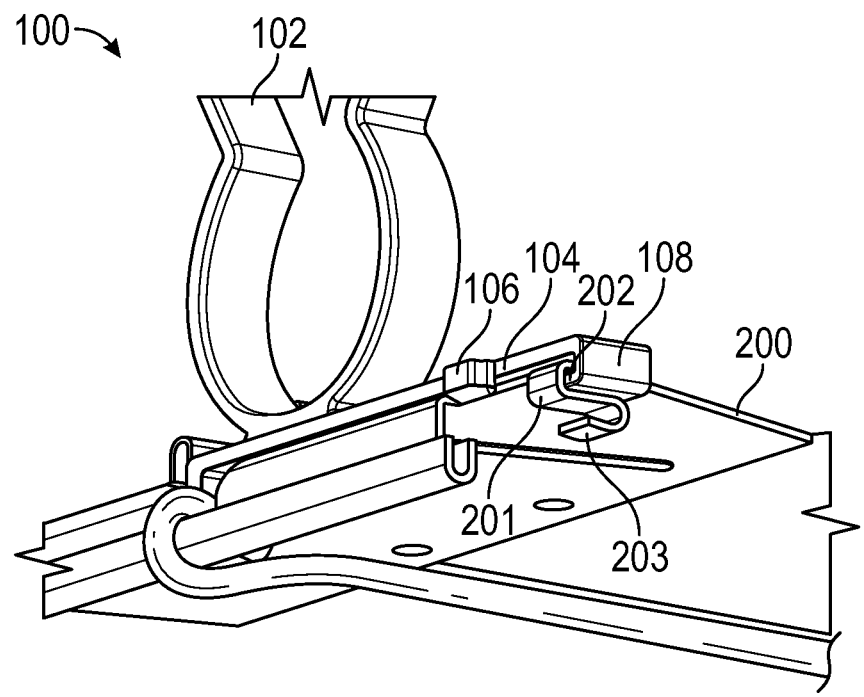
FIG. 1 perspective view of one embodiment of the invention.
Figure 2:
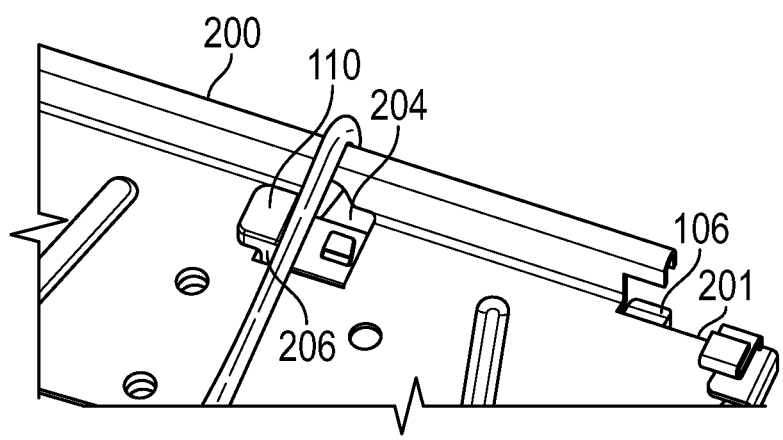
FIG. 2 is a bottom perspective view of the embodiment shown in FIG. 1.

FIGS. 1 and 2 depict one embodiment of the invention comprising a retaining clip 100 that attaches to a plate 200 found on an ironing board (not shown) or on a device having folding legs. Clip 100 has a U-shaped clip 102 that releasably engages at least one folding leg (not shown). Clip 102 is dimensioned to releasably engage a tubular leg.

Clip 100 attaches to base 200 by a compression fit that is created by a rectangular base 104 having a stop 106 on one edge that aligns with an edge 201 of plate 200. In addition, base 104 includes a U-shaped portion 108 that defines an opening that engages edge 202 of plate 200. Lastly, base 104 also includes a stepped portion 110 that engages edge 206 of plate 200 by extending through opening 204.

In use, clip 100 is attached to plate 200 by sliding stepped portion 110 through opening 204 while portion 108 is slid into position to engage edge 202. Base 104 is sized such that once edges 201, 202 and 206 are contacted, a compression fit is created that affixes clip 100 to base 200. U-shaped clip 102 is positioned to receive a supporting leg of a device so as to hold the folding leg of the device in a releasably secured position when the device is not in use.

Figure 3:
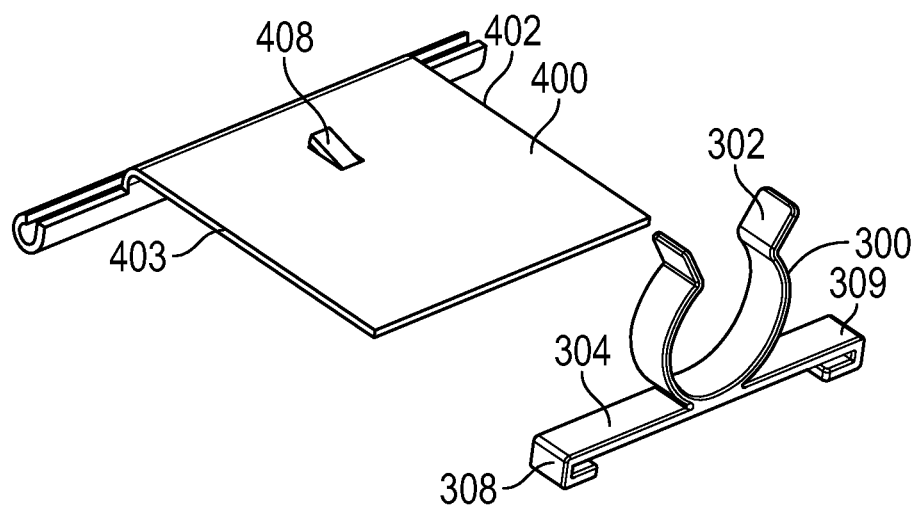
FIG. 3 is an exploded perspective view of a second embodiment of the invention.
Figure 4:
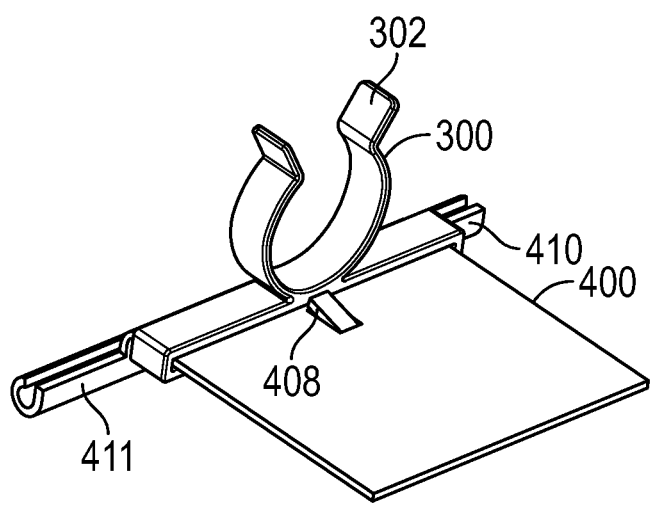
FIG. 4 is a perspective view of the embodiment shown in FIG. 3.
Figure 5:
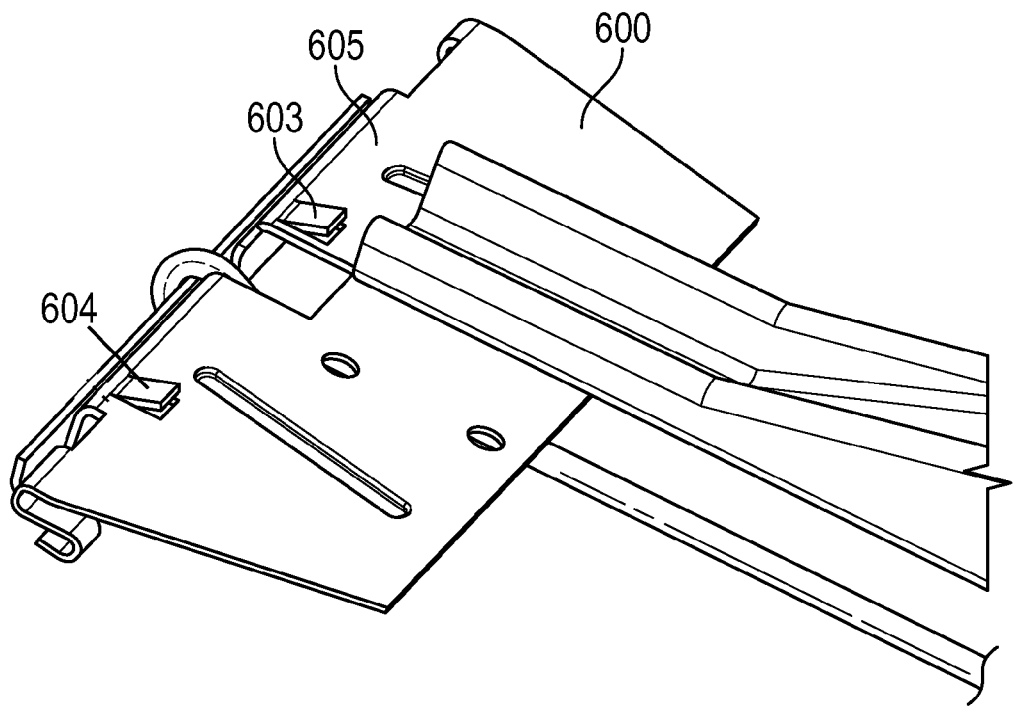
FIG. 5 is a bottom perspective view of a third embodiment of the invention.
Figure 6:
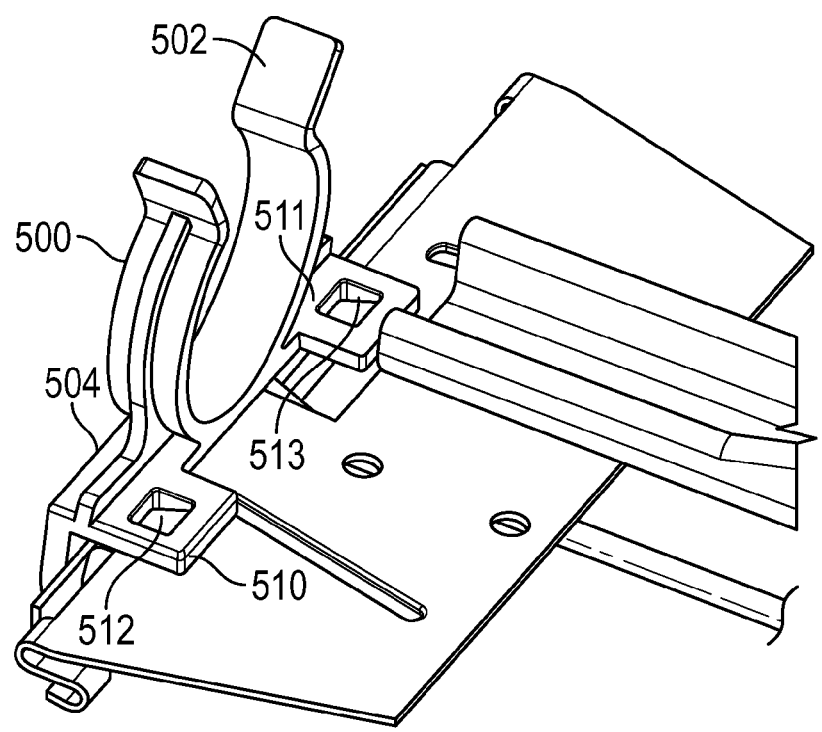
FIG. 6 is a top perspective view of the embodiment shown in FIG. 5.
Figure 7:
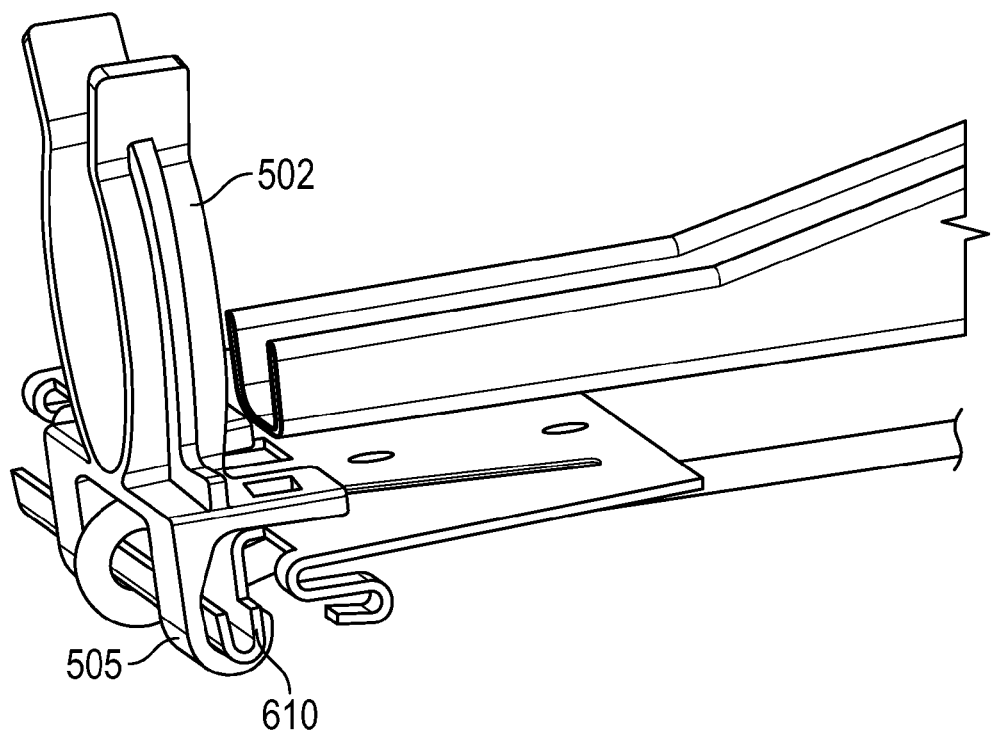
FIG. 7 is a side view of the embodiment shown in FIG. 5.
Figure 8:
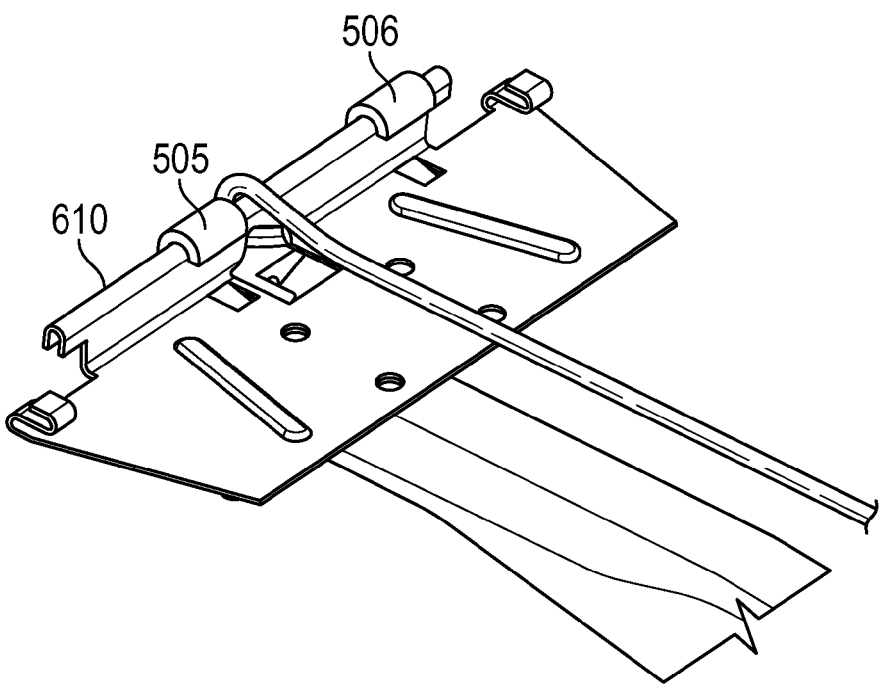
FIG. 8 is bottom view of the embodiment shown in FIG. 5.
Figure 9:
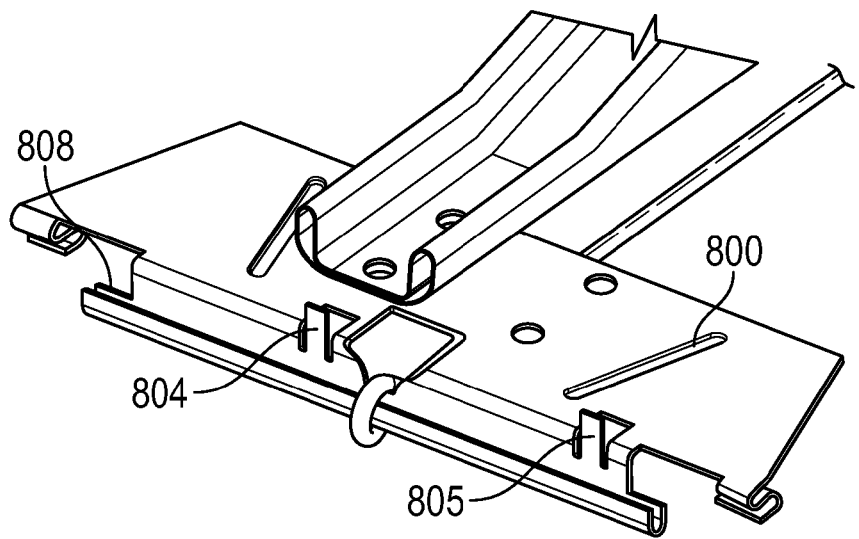
FIG. 9 is a bottom perspective view of a third embodiment of the invention.
Figure 10:
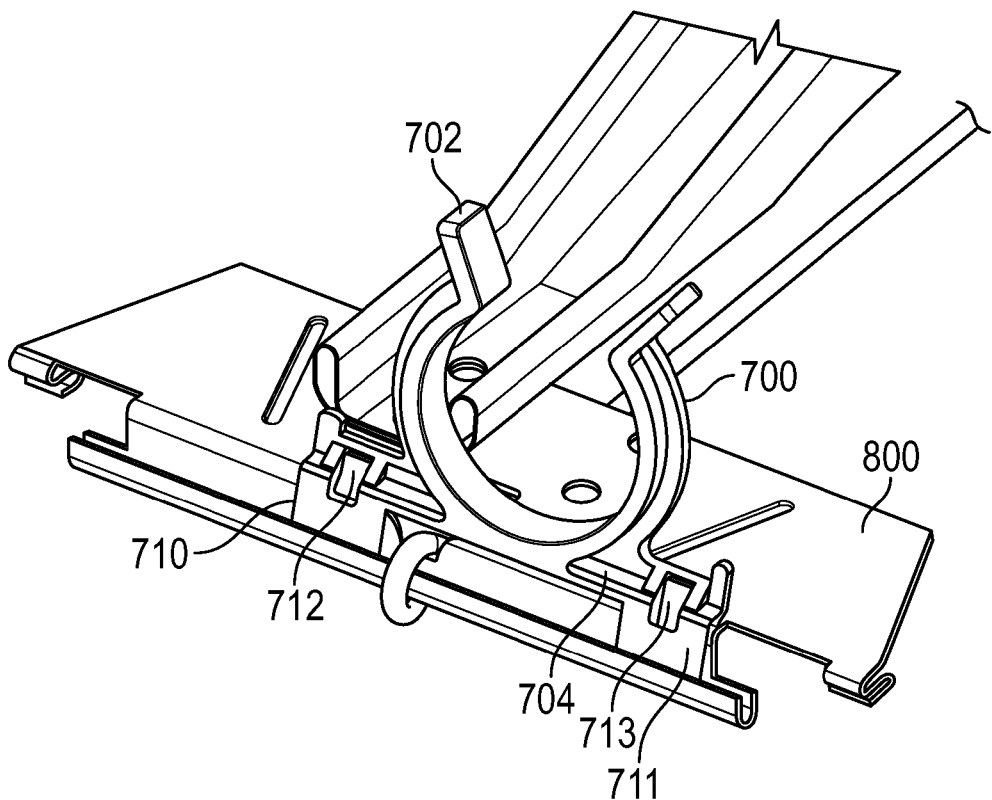
FIG. 10 is another perspective view of the embodiment shown in FIG. 9.
Figure 11:
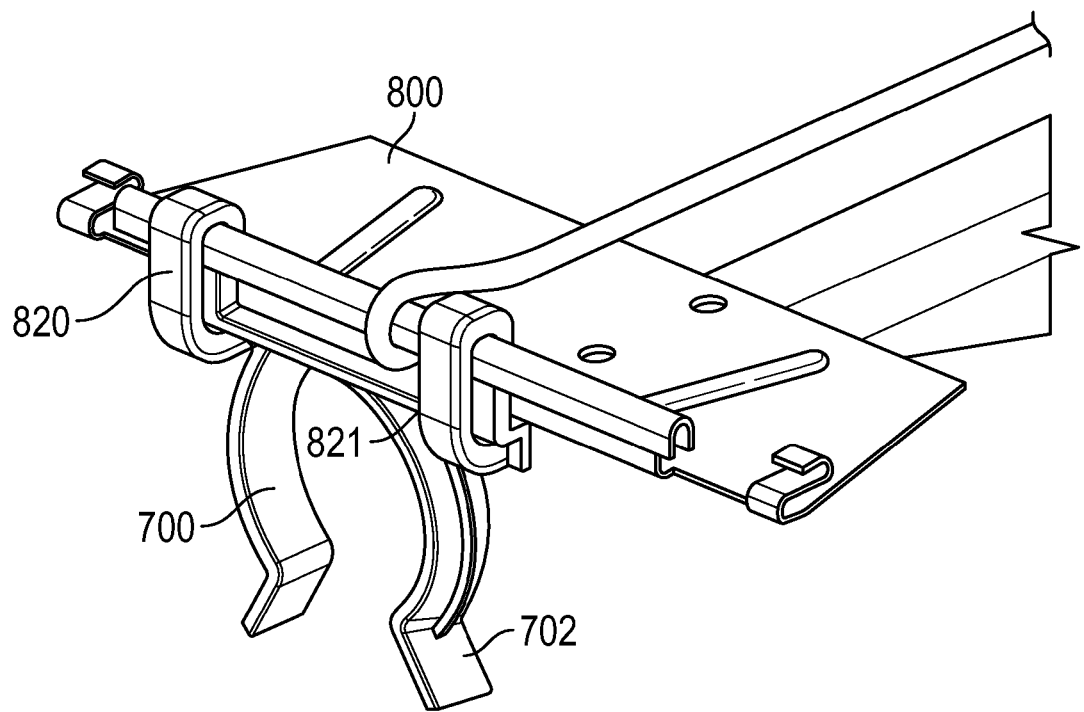
FIG. 11 is yet another perspective view of the embodiment shown in FIG. 9.
Figure 12:
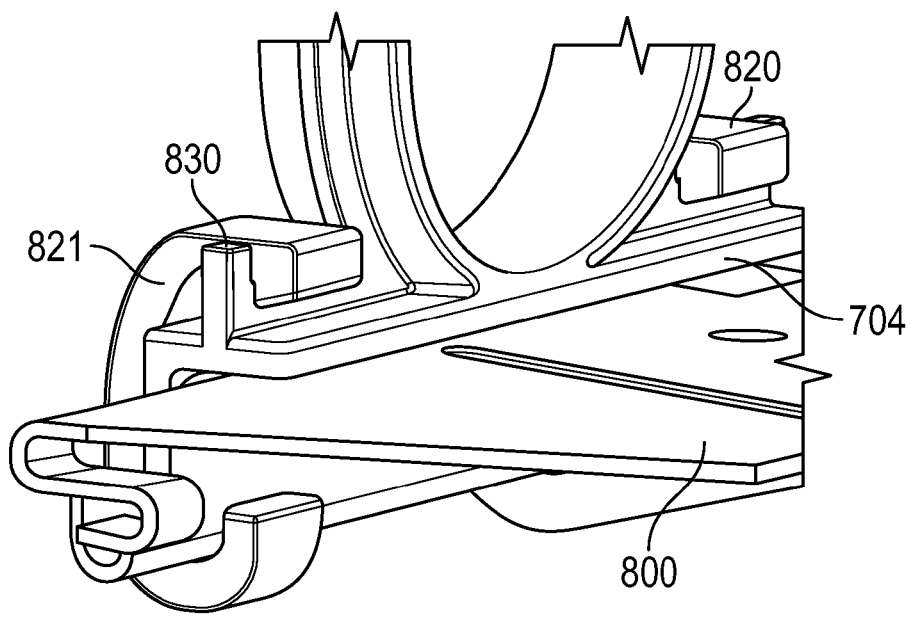
FIG. 12 is a perspective view of the embodiment shown in FIG. 9.

FIGS. 3 and 4 depict a second embodiment of the invention comprising a retaining clip 300 that attaches to a plate 400 found on an ironing board (not shown) or on a device having folding legs. Clip 300 includes a U-shaped clip 302 that releasably engages at least one folding leg (not shown). Clip 300 attaches to base 400 by a compression fit that is created by a rectangular base 304 having opposingly located U-shaped ends 308-309 that define openings that engage edges 402-403 of plate 400. To further restrict and retain clip 300, plate 400 also includes a boss 408.

In use, clip 300 is attached to plate 400 by sliding base 304 along plate 400 until it passes over boss 408. Once base 304 passes over boss 408, stops 410-411 and boss 408 lock the base in one direction and the engagement between edges 402-403 and U-shaped portions 308-309 lock the base in the other direction.

FIGS. 5 through 8 illustrate another embodiment of the invention comprising a retaining clip 500 that attaches to a plate 600 found on an ironing board (not shown) or on a device having folding legs. Clip 500 has a U-shaped clip 502 that releasably engages at least one folding leg (not shown). Clip 500 attaches to base 600 by a compression fit that is created by a rectangular base 504 having extensions 510-511 that define apertures 512-513. Apertures 512-513 are dimensioned to receive projections 603 and 604 of plate 600. Clip 500 also includes J-shaped or curved sections 505 and 506 that are sized to engage J-shaped or curved channel 610 of base 600.

In use, clip 500 is attached to plate 600 by engaging extensions 505 and 506 to one side of plate 600 so that the curved section 610 is located therein and then rotating the base towards projections 603 and 604 until projections 603 and 604 are positioned in apertures 512-513 thereby locking base 500 to plate 600. At this point, sections 510 and 511 engage the other side of plate 600.

FIGS. 9 through 12 illustrate another embodiment of the invention comprising a retaining clip 700 that attaches to a plate 800 found on an ironing board (not shown) or on a device having folding legs. Clip 700 has a U-shaped clip 702 that releasably engages at least one folding leg (not shown). Clip 700 attaches to base 800 by a compression fit that is created by a rectangular base 704 having extensions 710-711 that engage one side of plate 800 that defines apertures 712-713. Apertures 712-713 are dimensioned to receive projections 804-805 of plate 800. In addition, a portion of each extension 710-711 is sized to fit into U-shaped channel 808.

In use, clip 700 is attached to plate 800 by sliding projections 804-805 into apertures 712-713 to engage one side of the plate while extensions 710-711 are positioned in channel 808 and engage another side of the plate. Clamps 820-821 are then used to secure the clip to the plate. A boss 830 keeps clamp 821 from disengaging with a similarly positioned boss (not shown) to secure clamp 820.

Figure 13:
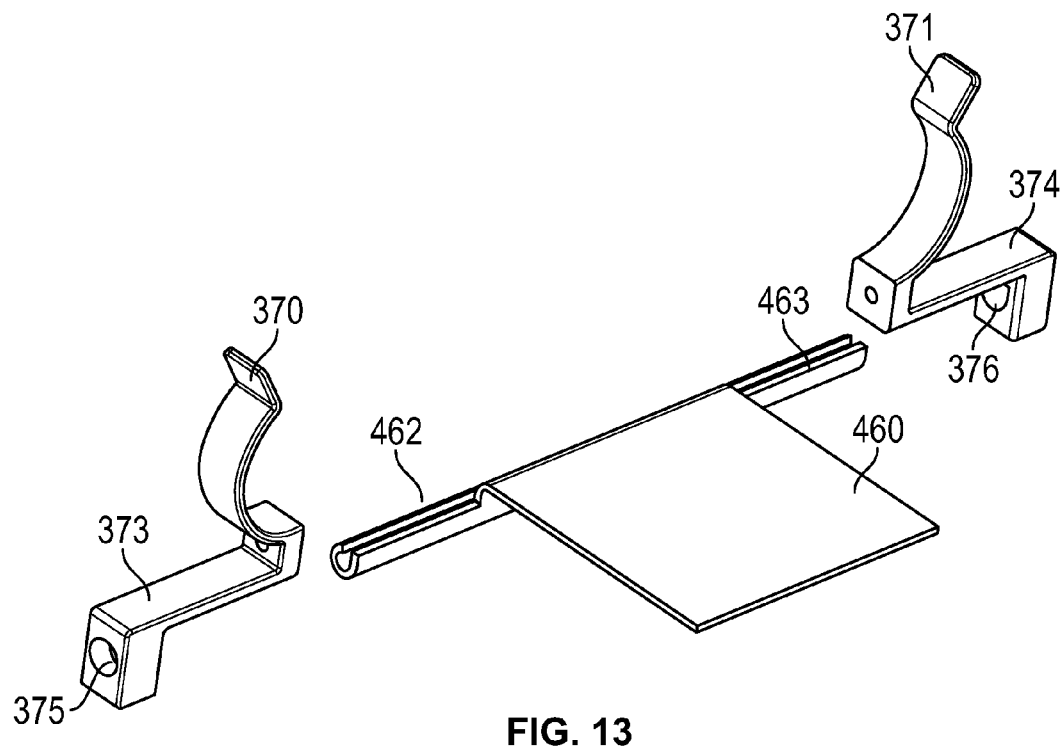
FIG. 13 is an exploded perspective view of a fourth embodiment of the invention.
Figure 14:
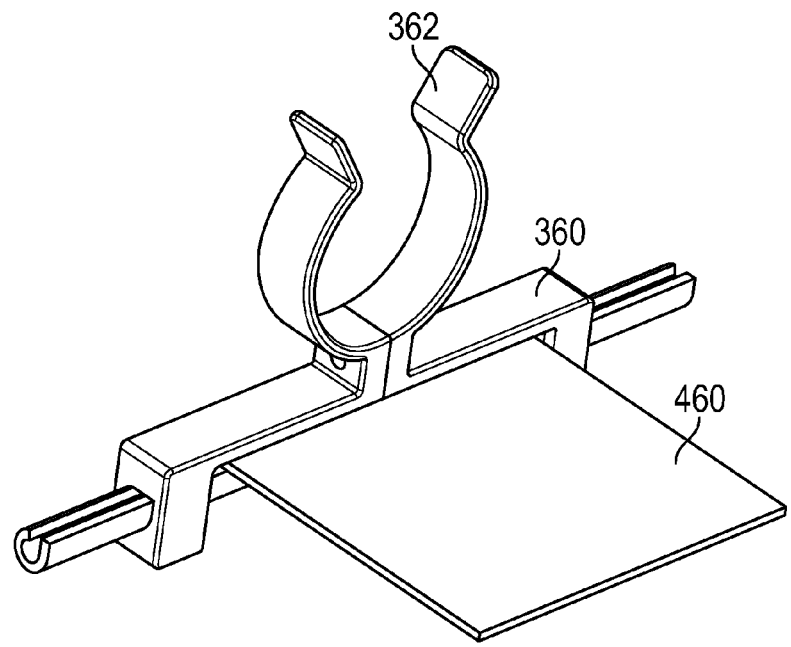
FIG. 14 is a perspective view of the embodiment shown in FIG. 13.

FIGS. 13 and 14 depict another embodiment of the invention comprising a retaining clip 360 that attaches to a plate 460 found on an ironing board (not shown) or on a device having folding legs. Clip 360 includes a U-shaped clip 362 that releasably engages at least one folding leg (not shown).

Clip 360 also includes sections 370-371 each having an extension 373-374 defining apertures 375-376. To attach clip 360, each section is slid over arms 462 and 463 and snapped together in ways known to those of skill in the art.

Figure 16:
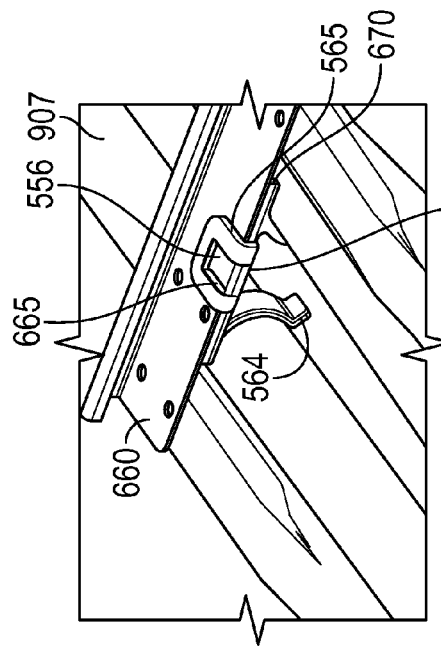
FIG. 16 is a top perspective view of the embodiment shown in FIG. 15.
Figure 17:
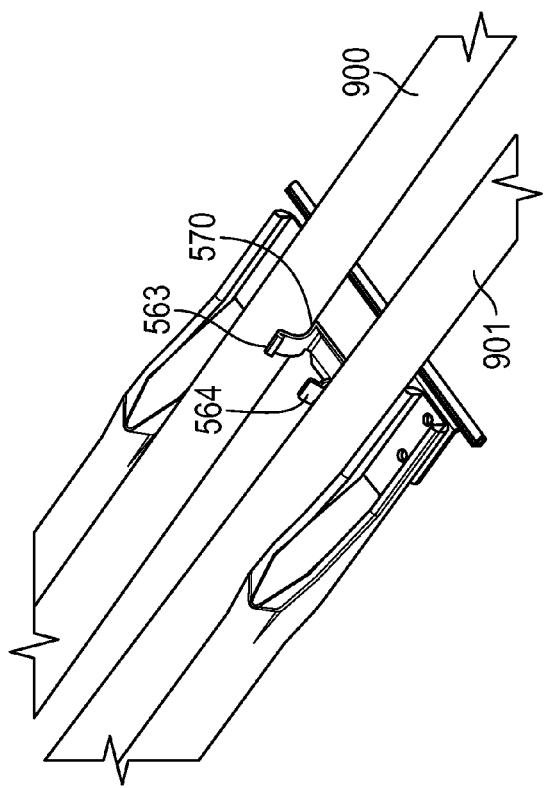
FIG. 17 is another perspective view of the embodiment shown in FIG. 15.
Figure 15:
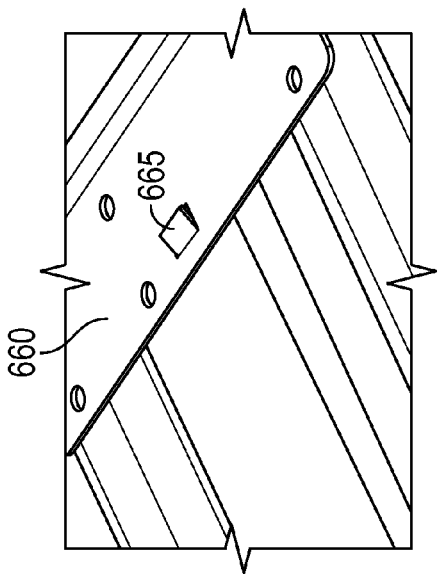
FIG. 15 is a bottom perspective view of a fifth embodiment of the invention.
Figure 18:
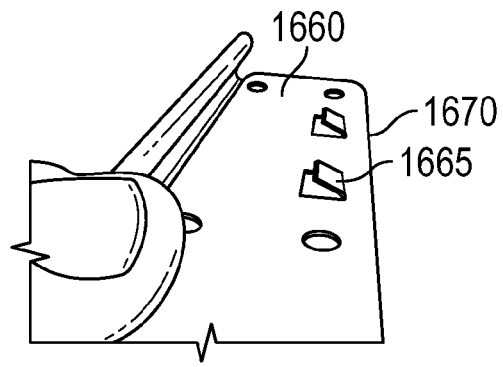
FIG. 18 is a perspective view of a plate to be used with a sixth embodiment of the invention.
Figure 19:
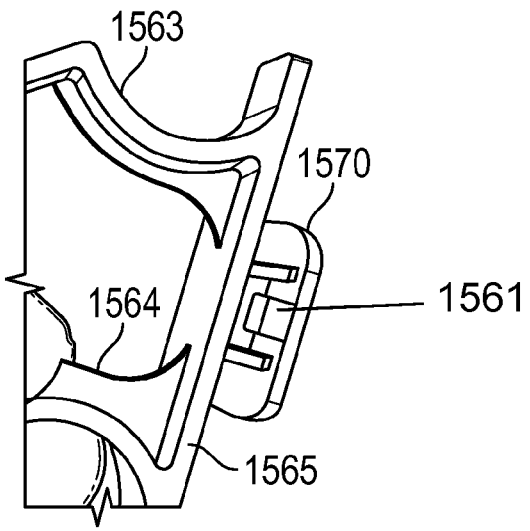
FIG. 19 is a perspective view of a clip to be used with a sixth embodiment of the invention.
Figure 20:
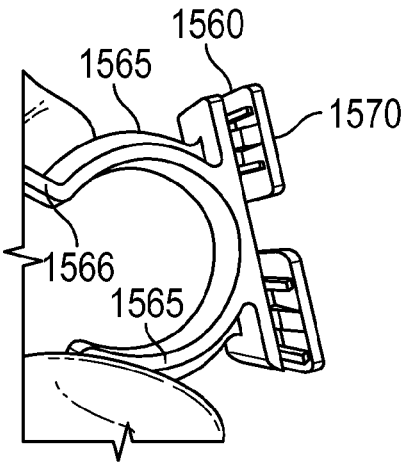
FIG. 20 is a perspective view of another clip to be used with a sixth embodiment of the invention.
Figure 21:
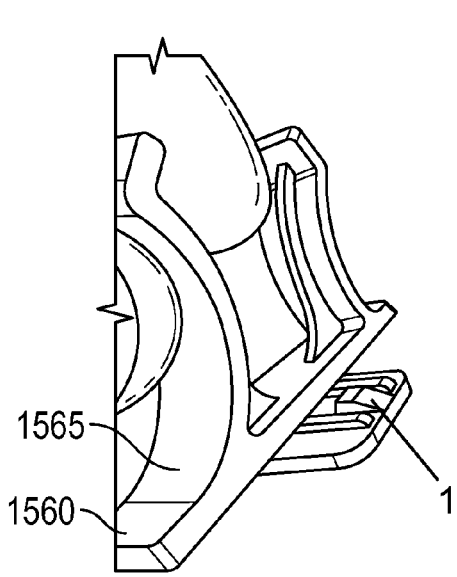
FIG. 21 is a perspective view of the clip shown in FIG. 19.
Figure 22:
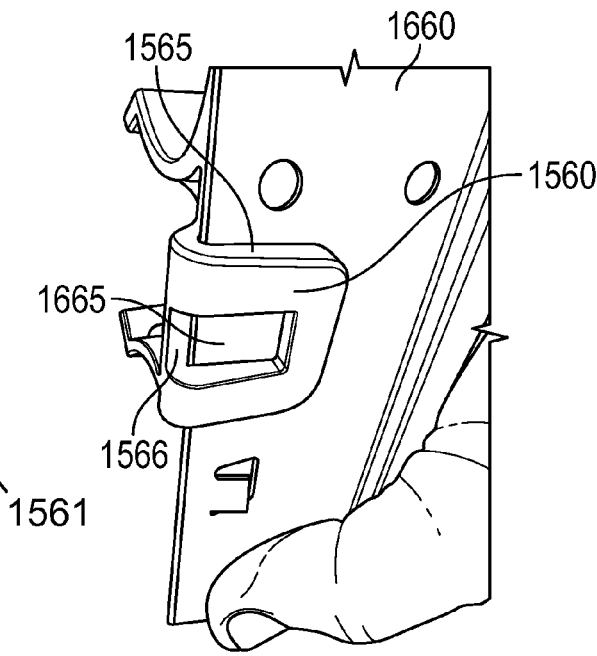
FIG. 22 illustrates the attachment of clips to the base.

FIGS. 15 through 17 illustrate another embodiment of the invention comprising a retaining clip 560 that attaches to a plate 660 found on an ironing board (not shown) or on a device having folding legs. Clip 560 has opposing semi-U-shaped clips 563-564 that releasably engage a section of two legs 900 and 901 as shown in FIGS. 16 and 17.

Clip 560 attaches to base 660 by a compression fit that is created by a rectangular base 565 that defines an opening 566 that receives a boss 665 of plate 660. In addition, base 560 has a portion 570 that creates a U-shaped channel that is sized to receive and slide over edge 670 with each section of the channel engaging an opposingly located side of the plate. As base 560 is slid over edge 670 angled boss 665 engages and is received in opening 565. Once fully engaged, base 560 is locked in place.

In addition, base 560 could be configured as described above for the other described embodiments to deploy a single U-shaped leg locking clip to engage a single leg such as leg 900. In addition, the semi-U-shaped clips shown in FIGS. 16 and 17, may also be used instead of the U-shaped leg locking clips shown in the prior embodiments in the event more than one leg is needed to be secured. Furthermore, while tubular legs have been shown, the invention is not so limited and the teaching described above may be used with any leg configuration and shape by simply designing the leg locking clip to be complimentary in shape. Lastly, the bosses described above may also be angled as shown to promote ease of use.

Figure 23:
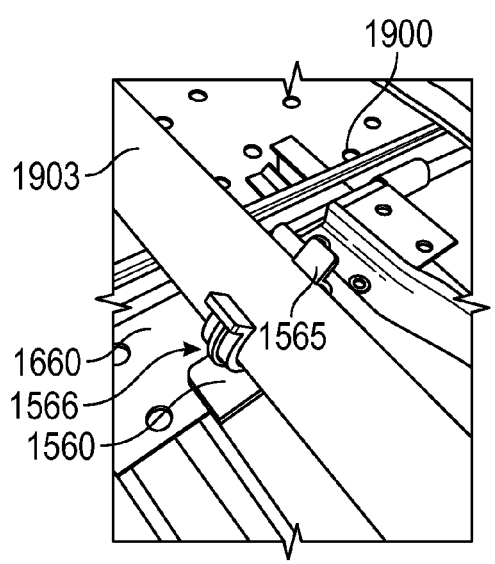
FIG. 23 is a perspective view of the clip shown in FIG. 20 engaging a leg.
Figure 24:
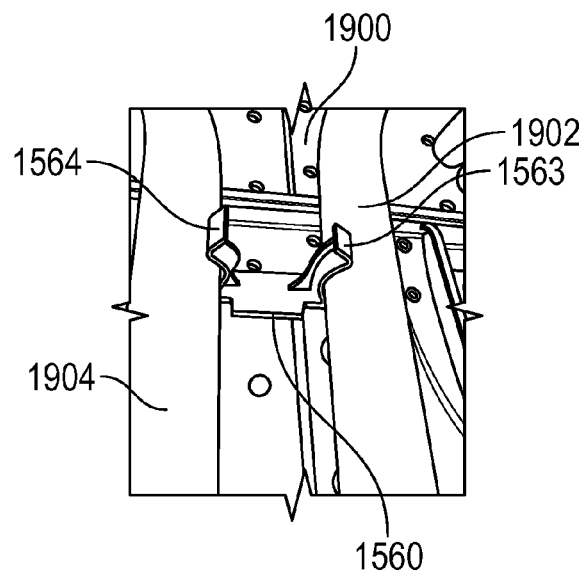
FIG. 24 is a perspective view of the clip shown in FIG. 19 engaging the legs of a device.

FIGS. 18 through 24 illustrate another embodiment of the invention comprising a retaining clip 1560 that attaches to a plate 1660 found on an ironing board 1900 or on a device having folding legs. Clip 1560 has opposing semi-U-shaped clips 1563-1564 that releasably engage a section of two legs 1902 and 1904 as shown in FIG. 24. Clip 1560 may also have opposing semi-U-shaped clips 1565-1566 that releasably engage a section of leg 1903 as shown in FIG. 23.

Clip 1560 attaches to base 1660 by a compression fit that is created by a rectangular base 1565 that defines an opening 1566 (FIG. 22) that receives a boss 1665 (FIGS. 18 and 22) of plate 1660. In addition, base 1560 has a portion 1570 that creates a U-shaped channel that is sized to receive and slide over edge 1670 while each section of the channel engages an opposingly located side of the plate. As base 1560 is slid over edge 1670 angled boss 1665 acts as a locking member that engages and is received in opening 1565. Once fully engaged, boss 1561 locks base 1560 in place.

In addition, all embodiments described above may be configured to deploy a single U-shaped clip to engage a single leg such as leg 1903. In addition, the semi-U-shaped clips may also be configured to secure multiple legs 1902 and 1904 as shown. Furthermore, while tubular legs have been shown, the invention is not so limited and the teachings described above may be used with any leg configuration and shape by simply designing the clip to be complimentary in shape. Lastly, the bosses described above may also be angled as shown to promote ease of use.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. An ironing board having at least one adjustable leg comprising:
   a plate having a first side and a second side and at least one curved edge;
   a base member having a first section adapted to engage said first side of said plate and a second section adapted to engage said second side of said plate;
   said base having at least one opening;
   said plate including at least one locking member that is positioned to be received within said at least one opening of said base to retain said base on said plate;

at least one leg locking clip attached to said base, said leg locking clip adapted to extend away from said plate section and releasably engages said at least one adjustable leg; and said first section of said base includes a plurality of curved sections that are sized to engage said at least one curved edge of said plate.

2. The device of claim 1 wherein said second section of said base includes a plurality of openings and said plate includes a plurality of locking members that are positioned to be received within said openings of said base to retain said base on said plate.

3. The device of claim 1 wherein said curved sections are J-shaped.

4. An ironing board having at least one adjustable leg comprising:
- a plate having a first side and a second;
- a base member having a first section adapted to engage said first side of said plate and a second section adapted to engage said second side of said plate;
- said base having at least one opening;
- said plate including at least one locking member that is positioned to be received within said at least one opening of said base to retain said base on said plate;
- at least one leg locking clip attached to said base, said leg locking clip adapted to extend away from said plate section and releasably engages said at least one adjustable leg; and
- said first section of said base includes a plurality of extensions that extend into a channel formed in one side of said plate.

5. The device of claim 4 wherein said second section of said base includes a plurality of openings and said plate includes a plurality of locking members that are positioned to be received within said openings of said base to retain said base on said plate.

6. The device of claim 5 further including a plurality of clamps that secure said clip to said plate.

7. The device of claim 6 further including a plurality of bosses that lock said clamps in place.

8. An ironing board having at least one adjustable leg comprising: a plate having a first side and a second side; a base member having first and said second sections that form a channel adapted to receive said plate; at least one leg locking clip attached to said base, said leg locking clip adapted to extend away from said plate section and releasably engages said at least one adjustable leg; and said second section of said base includes a plurality of openings and said plate includes a plurality of locking members that are positioned to be received within said openings of said base to retain said base on said plate.

9. The device of claim 8 wherein said locking member extends away from said plate at an angle and said second section of said base includes a boss positioned to engage said locking member.

* * * * *